United States Patent [19]
Barkis et al.

[11] 4,368,233
[45] Jan. 11, 1983

[54] COATED WOVEN AND NON-WOVEN POLYOLEFIN ARTICLES

[75] Inventors: Edward Barkis; Robert R. Crummer, both of Marietta; James M. Joyner, East Point, all of Ga.

[73] Assignee: Standard Oil Company (Indiana), Chicago, Ill.

[21] Appl. No.: 194,475

[22] Filed: Oct. 6, 1980

Related U.S. Application Data

[62] Division of Ser. No. 62,774, Aug. 1, 1979, Pat. No. 4,255,323, which is a division of Ser. No. 671,068, Mar. 29, 1976, Pat. No. 4,211,692.

[51] Int. Cl.³ .................................................. B32B 7/00
[52] U.S. Cl. .............................. 428/245; 156/244.27; 428/258; 428/262; 428/286; 428/290
[58] Field of Search ............... 428/245, 246, 258, 290, 428/286, 260, 517, 516, 519, 520, 515, 262; 264/DIG. 57; 156/244.11

[56] References Cited

U.S. PATENT DOCUMENTS

| | | | |
|---|---|---|---|
| 2,714,571 | 8/1955 | Irion et al. | 156/244.27 X |
| 3,058,863 | 10/1962 | Gaines et al. | 156/244.27 X |
| 3,464,850 | 9/1969 | Haefele | 428/245 |
| 3,470,055 | 9/1969 | Wade | 156/244.27 |
| 3,513,057 | 5/1970 | Falcone et al. | 428/290 X |
| 3,814,623 | 6/1974 | Martinez et al. | 428/290 X |
| 3,821,146 | 6/1974 | Drelich et al. | 428/290 X |
| 3,876,452 | 4/1975 | Anspon et al. | 156/244.27 X |

FOREIGN PATENT DOCUMENTS 229472 4/1958 Australia .

Primary Examiner—Thurman K. Page
Attorney, Agent, or Firm—David E. Boone; William T. McClain; William H. Magidson

[57] ABSTRACT

Extrusion coating compositions for woven and non-woven polyolefin substrates are disclosed which employ an ethylene-propylene-diene terpolymer rubber, a high density polyethylene, an ethylene-propylene block copolymer and an ethylene-isobutylacrylate copolymer. Optionally, ultraviolet stabilizers, flame retardants and pigments can be added to each. Also disclosed are woven and non-woven polyolefin substrates which are coated with the above-cited extrusion coating compositions.

10 Claims, No Drawings

COATED WOVEN AND NON-WOVEN POLYOLEFIN ARTICLES

This is a division of application Ser. No. 62,774, filed Aug. 1, 1979, now U.S. Pat. No. 4,255,323, which is a division of U.S. Pat. No. 671,068 filed Mar. 29, 1976, now U.S. Pat. No. 4,211,692.

BACKGROUND

Extrusion coating involves the process of extruding a molten film from a die and contacting this molten film with a substrate under pressure in the nip of two counter-rotating rolls or the like. Both of these rolls can be chill rolls, which by definition means temperature controllable rolls. Alternatively, one of these rolls can be a pressure roll, which has a deformable surface able to distribute pressure over an uneven surface. The pressure roll is in contact with the side not being coated, and the chill roll is in contact with the side being coated.

Extrusion coating of woven and non-woven polyolefin substrates involves several problems. Some examples of such problems are extruder surging, poor coating adhesion particularly to polypropylene, and unaesthetic hand for some coatings having a thickness greater than one mil. To decrease extruder surging, which is the non-uniformity of gauge or coating weight in the machine direction, and to increase adhesion of the extruded coating to polypropylene substrates, the melt flow rate of the extrusion coating is generally increased. However, to decrease undesirable neck-in which is the difference between the width of the web as it exits from a die and that width at the point of contact with a substrate, the melt flow and temperature of the extruded coating are generally decreased. In summary, to achieve a suitable extrusion coating for polyolefins and more specifically polypropylene, the range of temperatures and flow rates that are usable must resolve a variety of problems which have conflicting methods of solution.

Good adhesion with extrusion coatings of low density plyethylene to high density polyethylene fabrics requires extrusion temperatures of about 600° F. in order to cause some melt oxidation. However, neither low density nor high density polyethylene alone can be made to adhere well to polypropylene fabrics regardless of process conditions. Surface primers for polypropylene fabrics have had limited success.

In U.S. Pat. No. 3,524,759 (1970) of R. L. McConnell et al., a process for curtain coating of flat sheets, paper, cardboard, articles of any size or shape, etc. is disclosed. The composition employed in that curtain coating process was a thermoplastic composition having a melt viscosity of 190° C. of 5,000 to 125,000 cp. comprising:

(1) 40 to 99 percent by weight of a copolymer of 55 to 99 percent by weight of ethylene and 1 to 45 percent of at least one comonomer selected from the group consisting of:
  (a) alkenyl alkanoates wherein said alkenyl portion contains 2–4 carbon atoms and said alkanoate portion contains 2–6 carbon atoms,
  (b) alkyl acrylates, wherein said alkyl contains 1 to 8 carbon atoms,
  (c) alkyl methacrylates wherein said alkyl contains 1 to 8 carbon atoms,
  (d) acrylic acid,
  (e) methacrylic acid, and (2) 1 to 60 percent by weight of a crystallizable polymer of an α-olefin having 2 to 10 carbon atoms, said polymer having a melt viscosity at 190° C. of 1,000 to about 20,000 cp. when the polymer is polyethylene and a melt viscosity at 190° C. of 1,000 to about 400,000 cp. when the polymer is polypropylene or other higher polyolefin homo- or copolymer. In preferred embodiments of this invention, the melt viscosity of the coating composition is at least 15,000 cp. and the copolymer is ethylene/vinyl acetate.

McConnell et al. ('759) does not disclose the use of similar coating compositions for an extrusion coating process nor the use of polyolefins and particularly polypropylene as coatable substrates. In the relevant art, curtain coating is a different and distinct coating process from that of an extrusion coating process. Each requires coating compositions having very different rheological properties. A principal limitation of curtain coating is that useful coating compositions must be sufficiently fluid to fall freely and sufficiently cohesive to present a continuous film to the substrate.

BRIEF DESCRIPTION OF THE INVENTION

It is an object of this invention to provide an extrusion coating composition having good adhesion for polypropylene substrates and satisfactory adhesion for other polyolefin substrates such as high density polyethylene substrates which can be applied at temperatures in the range of about 500° F. to 580° F.

It is an object of this invention to provide a coating in which temperature sensitive fire retardants for polyolefin polymers can be incorporated and used without severe decomposition.

It is an object of this invention to provide a coating which provides a soft fabric hand. Where a soft fabric hand means flexibility and/or lack of stiffness as the term is used to describe the handle or feel of fabrics.

It is an object of this invention to provide an extrusion coating composition having a sufficiently high melt strength and/or elasticity to allow coating speeds in excess of 100 feet/min. while providing a finished coating of 1 mil or greater on polyolefin substrates that is void free.

Other objects of this invention are clear to one skilled in the art based upon this Specification.

One embodiment of this invention is an extrusion coating composition having a melt flow rate in the range of about 2–8 g/10 min. (ASTM D 1238 Condition L) comprising:

(a) about 50–90% and preferably about 60–80% by weight of a terpolymer containing reacted ethylene, propylene, and a diene, said terpolymer having a flow rate in the range of about 0.5 to 1.0 g/10 min. and preferably in the range of about 0.6 to 0.7 g/10 min. (ASTM D-1238-70 Condition L), wherein the diene is in a low concentration up to a maximum concentration in percent by weight of about 3% and is a monomer selected from the group consisting of 1,3-butadiene, isoprene, chloroprene, cyclooctadiene-1,5, dicyclopentadiene, cyclododecatriene-1,5,9, cyclododecadiene-1,7, cycloheptadiene-1,4, cyclohexadiene-1,4, norbornadiene, methylene-norbornene, methyl-tetrahydroindene, dimethyl-tetrahydroindene, 6-methyl-heptadiene-1,5, hexadiene-1,4, 6-methyl-4,7,8,9-tetrahydroindene, and ethylidene-norbornene, and wherein the reacted ethylene and propylene are in a ratio by weight of about 3:1, (b) about 50–10% and preferably about 40–20% by weight of a high density polyethylene having a melt index in the range of about 0.2–30 g/10 min. and preferably in the range of about 10–20 g/10 min. (ASTM D-1238-65T Condition E), an unannealed density in the range of about 0.956–0.965, a weight average molecular weight in the range of about 50,000–200,000, and optionally (c) one or more of the additional components selected from the group consisting of:

(1) about 0–10% and preferably about 0.5–5% by weight of an opacifier such as $TiO_2$ able to pass through a 200 mesh screen, and preferably through a 325 mesh screen, (2) about 0–20% and preferably about 0.5–15% by weight of a fire retardant composition comprising one or more poly-halogenated organic compounds and antimony trioxide, (3) about 0–5% and preferably about 0.5–3% by weight of an ultraviolet light stabilizer for polyolefins such as nickel dibutyl dithiocarbamate, 2-(2-hydroxy-5-t-octylphenyl)benzotriazole, 2-(3'-tertbutyl-2'-hydroxy-5-methylphenyl)-5-chlorobenzotriazole, 2-(3',5'-di-tertbutyl-2'-hydroxyphenyl)-5-chlorobenzotriazole, 2-hydroxy-4-n-octyloxybenzophenone, bis[O-ethyl (3,5-di-tertbutyl-4-hydroxybenzyl)]phosphonate, etc., and (4) about 0–5% and preferably about 0.5–3% by weight of a colorant dispersible in polyolefins such as a high density polyethylene with a melt index in the range of about 0.2–30 g/10 min. and/or polypropylene with a melt flow rate in the range of about 20–50 g/10 min.

Another embodiment of this invention is an extrusion coating composition having a melt flow rate in the range of about 50–85 g/10 min. (ASTM D 1238 Condition L) comprising:

(a) about 30–75% and preferably about 30–50% by weight of an olefin polymer blend, disclosed in U.S. Pat. No. 3,887,640 (1975) which patent is incorporated herein by reference, this blend comprises about 40 to 99 and preferably about 75 to 97 percent by weight of an ethylene-propylene block copolymer comprising at least about 80 percent by weight polymerized propylene having a flow rate of about 15 dg/min. to 100 dg/min. and preferably of about 25 dg/min. to 95 dg/min. as determined by ASTM D-1238-62T and about 1 to 60 and preferably about 2.5 to 25 percent by weight of polyethylene having a melt index recovery of at least about 50 and a density greater than about 0.912, (b) about 70–25% and preferably about 50–30% by weight of an ethylene-isobutylacrylate copolymer having a flow rate in the range of about 50 to 90 g/10 min. (ASTM D-1238-70 Condition L) and a density at 23° C. in the range of about 0.920–0.930, and comprising about 30% by weight of reacted isobutylacrylate and optionally, (c) one or more of a variety of additional components selected from the group consisting of:

(1) about 0–10% and preferably about 0.5–5% by weight of an opacifier such as $TiO_2$ having a particle size able to pass through a 200 mesh screen and preferably through a 325 mesh screen, (2) about 0–20% and preferably about 0.5–15% by weight of a fire retardant composition comprising one or more polyhalogenated organic compounds and antimony trioxide, (3) about 0–3% and preferably about 0.5–2% by weight of an ultraviolet light stabilizer such as nickel bis[O-ethyl (3,5 di-tertbutyl-4-hydroxybenzyl]phosphonate, 2-(2-hydroxy-5-t-octylphenyl)benzotriazole, 2-(3'-tertbutyl-2'-hydroxy-5-methylphenyl)-5-chlorobenzotriazole, 2-(3',5'-di-tert-butyl-2'-hydroxyphenyl)-5-chlorbenzotriazole, 2-hydroxy-4-n-octyloxybenzophenone, etc., and (4) about 0–5% and preferably about 0.5–3% by weight of a colorant dispersible in polyolefins, such as high density polyethylene having a melt index in the range of about 0.20 to 30 g/10 min. and/or polypropylene with a melt flow rate in the range of 20 to 50 g/10 min.

Still another embodiment of this invention is an extrusion coating composition having a melt flow rate in the range of about 20–30 g/10 min. (ASTM D 1238 Condition L) comprising:

(a) about 30–50% and preferably about 35–45% by weight of an ethylene-isobutylacrylate copolymer having a flow rate in the range of about 50–90 g/10 min. (ASTM D-1238-70 Condition L), and a density at 23° C. in the range of about 0.920–0.930, and comprising about 30 percent by weight of reacted isobutylacrylate, (b) about 10–40% and preferably about 25–35% by weight of a terpolymer comprising reacted ethylene, propylene, and a diene, said terpolymer having a flow rate in the range of about 0.5 to 1.0 g/10 min. and preferably in the range of about 0.6 to 0.7 g/10 min. (ASTM D-1238-70 Condition L), wherein the diene is in a low concentration up to a maximum concentration in percent by weight of about 3% and is a monomer selected from the group consisting of 1,3-butadiene, isoprene, chloroprene, cyclooctadiene-1,5, dicyclopentadiene, cyclododecatriene-1,5,9, cyclododecadiene-1,7, cycloheptadiene-1,4, cyclohexadiene-1,4, norbornadiene, methylene-norbornene, methyl-tetrahydroindene, dimethyl-tetrahydroindene, 6-methylheptadiene-1,5, hexadiene-1,4, 6-methyl-4,7,8,9-tetrahydroindene, and ethylidene-norbornene, and wherein the reacted ethylene and propylene are in a ratio by weight of about 3:1, (c) about 10–40% and preferably about 25–35% by weight of a high density polyethylene having a melt index in the range of about 0.2–30 g/10 min. and preferably in the range of about 10–20 g/10 min. (ASTM D-1238-65T Condition E), an unannealed density in the range of about 0.956–0.965, a weight average molecular weight in the range of about 50,000–200,000, and optionally, (d) one or more of the additional components selected from the group consisting of:

(1) about 0–10% and preferably about 0.5–5% by weight of an opacifier such as $TiO_2$ able to pass through a 200 mesh screen, and preferably through a 325 mesh screen, (2) about 0–20% and preferably about 0.5–15% by weight of a fire retardant composition comprising one or more polyhalogenated organic compounds and antimony trioxide, (3) about 0–3% and preferably about 0.5–2% by weight of an ultraviolet light stabilizer for polyolefins such as nickel dibutyl dithiocarbamate, 2-(2-hydroxy-5-t-octylphenyl)benzo-triazole, 2-(3'-tertbutyl-2'-hydroxy-5-methylphenyl)-5-chlorobenzotriazole, 2-(3',5'-di-tertbutyl-2'-hydroxyphenyl)-5-chlorobenzotriazole, 2-hydroxy-4-n-octyloxy-benzophenone, nickel bis-(O-ethyl(3,5-di-tertbutyl-4-hydroxybenzyl))-phosphonate, etc., and (4) about 0–5% and preferably about 0.5–3% by weight of a colorant dispersible in polyolefins such as high density polyethylene having a melt index in the range of about 0.20 to 30 g/10 min. and/or polypropylene having a melt flow rate in the range of about 20 to 50 g/10 min.

The fire retardant composition comprising one or more polyhalogenated organic compounds and antimony trioxide referred to in the above described compositions is additionally defined hereinafter. U.S. patents incorporated herein by reference disclosing polyhalogenated organic compounds that are known to be useful in combination with antimony trioxide so as to impart fire retardancy to resinous polyolefin compositions containing them are: U.S. Pat. Nos. 3,275,596 (1966), 3,403,036 (1968), 3,419,518 (1968), and 3,738,958 (1973). These halogenated organic compounds are preferably characterized as:

1. being substantially non-volatile from a resinous polyolefin polymer matrix at the approximate melting point of a polymer composition comprising said resinous polyolefin polymer, antimony trioxide, and said halogenated organic compounds,
2. having a gram molecular weight above about 200; and
3. a halogen content in percent by weight of the halogenated compound in the range of about 35–93% wherein the halogen is selected from the group consisting of chlorine and bromine.

Other ultraviolet light stabilizers for polyolefins which can be used in the above described compositions can be found in the following U.S. patents incorporated herein by reference: U.S. Pat. Nos. 3,935,163 (1976), 3,919,234 (1975), 3,917,672 (1975), 3,936,418 (1976), and 3,932,324 (1976).

The above disclosed embodiments are generally prepared by a process of first forming a physical blend and then melt mixing that physical blend. The process of forming a physical blend involves physically weighing and then blending the appropriate components in a twin shell type blender and/or a Nauta Mixer for about 20 to 30 minutes and/or until a good dispersion of the physical blend is achieved. The process of melt mixing involves melting the composite blend in a compounding extruder having a screw with an L/D of about 24/1 or about 30/1 at a temperature through the barrel of 300°±5° F. with flange and adapter at 350°±5° F. The die is set at 375°±5° F. The compounding extruder is equipped with a mixing screw which ensures good melt mixing of the component parts of the physical blend. Back pressure and additional melt mixing is achieved by utilizing a series of metal screens, the smallest of which can range from about 100 to 325 in mesh size. The melt is forced through the screens and then through an appropriate die opening. The resulting individual strands are water quenched at temperatures of about 60° to 70° F. and subsequently cold cut to form individual pellets. The finished product then can be post blended if desired.

It is to be noted that in spite of apparent differences between the individual polymer components, they are surprisingly compatible in the melt phase in all of the above disclosed compositions.

The process of extrusion coating one of the above disclosed compositions involves extruding a molten film from a die having a slit opening in the range of about 1 to 20 mils. An extrusion pressure within this die is in the range of about 1,000 to 1,500 psi. The film as it exits the die is at a temperature in the range of about 500° F. to 580° F. This extruded film is then contacted with a woven or non-woven polyolefin substrate, to which a satisfactory bond therebetween can be made (see Example 4), at or just before the nip of two counter rotating rolls having diameters in the range of about 4–12 inches. A pressure in the range of about 100 to 200 lbs./linear inch is applied in the nip. The temperature of the chill roll is in the range of about 50°–70° F. The rate of speed of a coated substrate through the nip is in the range of about 100 to 160 ft/minute when a 1 mil thick coating is being applied.

DETAILED DESCRIPTION OF THE INVENTION

EXAMPLE 1

A physical blend was formed by physically weighing 41 grams of Eastman's ethylene-propylene copolymer (499-P), 40 grams of DuPont's ethylene-isobutylacrylate (3647-2), 9 grams of a fire retardant additive, 8 grams of a dispersible pigment and 2 grams of an ultraviolet light stabilizer each described in TABLE 1 into a Nauta mixer and mixing this blend for about 25 minutes. This physical blend was subsequently melt mixed by melting said physical blend in a compounding extruder with a screw having an L/D of 30/1 at a temperature through the barrel of about 300° F. with flange and adapter at about 350° F. and the die set at about 375° F. A back pressure is achieved by a series of metal screens having a mesh size of 325. The extrudate having a flow rate of about 62 g/10 min. (ASTM D 1238 Condition L) is in the form of strands which are water quenched at about 65° F. and cut to form individual pellets.

TABLE 1 discloses four examples of typical compositions made as described above. TABLE 2 gives the machine settings utilized while employing the compositions of TABLE 1 to form a coating of about one mil on a delustered polyolefin fiber substrate. The polyolefin fiber substrate was made either from Amoco 10-5156, a high ultraviolet light stabilized polypropylene, or from a general purpose resin containing a homopolymer of polypropylene and a general purpose stabilizer system, or from Amoco 30-605-A2, a high density polyethylene.

TABLE 1

|  | 1 | 2 | 3 | 4 |
|---|---|---|---|---|
| Eastman's ethylene-propylene copolymer 499-P | 41.0 | 30.0 | 75.0 | 40.0 |
| DuPont's ethylene isobutyl-acrylate 3647-2 | 40.0 | 70.0 | 25.0 | 35.0 |
| *Fire retardant additive | 9.0 | 0 | 0 | 15.0 |
| **Colorant | 8.0 | 0 | 0 | 8.0 |

TABLE 1-continued

|  | 1 | 2 | 3 | 4 |
|---|---|---|---|---|
| ***ultraviolet light stabilizer | 2.0 | 0 | 0 | 2.0 |

*Fire retardant additive contains about 60% by weight of decabromodiphenyl oxide and Sb₂O₃ in a ratio of about 2.1:1 and about 40% by weight of high density polyethylene having a melt flow rate of about 12 (ASTM D-1238).
**Colorant includes a mixture of TiO₂ and a blue pigment wherein about 3 parts by weight is TiO₂ to about 5 parts by weight of blue pigment is used.
***Ultraviolet light stabilizer is a 2:1 chelate of nickel employing an alkylated phenol phosphonate wherein 15% by weight is stabilizer and 85% by weight is polypropylene and/or high density polyethylene.

TABLE 2

Extrusion Rate: 320 lbs./hr.
Extruder:
  screw size: 3½ inches
  rate of rotation of screw: 135 rpm
  barrel temperature: Profile from 400° to 540° F.
  plastic pressure on extrusion: 1200 psi
  plastic temperature on extrusion: 530°±15° F.
  extruder die opening: 20 Mils
*Air gap: 2¾ inches
Pressure at nip: 125 lbs/linear inch
Temperature of chill roll: 55°±5° F.
Rate of movement of a polypropylene web: 110 ft/minute
*Air gap is the distance between the extruder die opening and the nip created by a chill roll and a pressure roll.

EXAMPLE 2

DuPont's 3391 ethylene-propylene-diene hydrocarbon terpolymer rubber and Amoco's 30-680-B4 high density polyethylene are first blended and then melt mixed as discussed in Example 1 alone or with various pigments, flame retardants, and ultraviolet light stabilizers to form various coating compositions.

TABLE 3 discloses three examples of such coating compositions. TABLE 4 gives the machine settings utilized while employing the coating compositions of TABLE 3 to form an approximately 3 mil coating on a woven polyolefin fiber substrate. The polyolefin fiber substrate used was made from either Amoco resin 10-5156 (polypropylene) or Amoco resin 10-5013 (high density polyethylene).

TABLE 3

|  | 1 | 2 | 3 |
|---|---|---|---|
| *Ethylene-propylene-diene terpolymer | 85.0 | 50.0 | 60.0 |
| **High density polyethylene | 15.0 | 50.0 | 15.0 |
| ***Colorant | 0 | 0 | 3.0 |
| TiO₂ | 0 | 0 | 5.0 |
| ***Fire retardant concentrate | 0 | 0 | 15.0 |
| ****Ultraviolet stabilizer concentrate | 0 | 0 | 2.0 |

*Ethylene-propylene-diene terpolymer obtainable from DuPont under the name ethylene-propylene-diene hydrocarbon rubber 3391.
**High density polyethylene is obtainable from Amoco, under the name high density polyethylene 30-680-B4 having a melt flow rate of about 12.
***See TABLE 1.
****Nickel dibutyl dithiocarbamate and/or alkylated phenol phosphate wherein 10 to 15% by weight is stabilizer and 85 to 90% by weight is polypropylene and/or high density polyethylene.

TABLE 4

Extrusion rate: 216 lbs/hr.
Extruder:
  screw size: 3½ inches
  rate of rotation of screw: 105 rpm
  barrel temperature: profile from 450° to 575° F.
  plastic pressure on extrusion: 1200 psi
  plastic temperature on extrusion: 550°±10° F.
  extruder die opening: 20 mils
*Air gap: 2¾ inches
Pressure at nip: 135 lbs/linear inch
Temperature of chill roll: 55°±5° F.
Rate of movement of a polypropylene web: 50 ft/min.
*Air gap is the distance between the extruder die opening and the nip created by a chill roll and pressure roll.

EXAMPLE 3

About 29.8% by weight of DuPont's ethylene-propylene-diene hydrocarbon rubber 3391, about 38.6% by weight of DuPont's ethylene-isobutylacrylate 3647-2, about 29.6% by weight Amoco's polyethylene 30-680-B4, and about 2% by weight of the ultraviolet stabilizer used in TABLE 1 are formulated as disclosed in Example 1. The finished composition has a flow rate of about 23 g/10 min. (ASTM D 1238 Condition L). The machine settings utilized for this coating composition to form an approximately 1 mil coating on a delustered woven polyolefin fiber substrate are given in TABLE 5. The polyolefin fiber substrate used is the same as described in Example 1.

TABLE 5

Extrusion rate: 320 lbs/hr.
Extruder:
  screw size: 3½ inches
  rate of rotation of screw: 135 rpm
  barrel temperature: profiled from 425° to 550° F.
  plastic pressure on extrusion: 1200 psi
  plastic temperature on extrusion: 545°±10° F.
  extruder die opening: 20 mils
*Air gap: 2¾ inches
Pressure at nip: 130 lbs/linear inch
Temperature of chill roll: 55°±5° F.
Rate of movement of the woven polypropylene web: 140 ft./min.
*Air gap is the distance between the extruder die opening and the nip created by a chill roll and pressure roll.

EXAMPLE 4

The coated woven polyolefin substrates produced in examples 1, 2, and 3 are discussed in more detail hereinafter. The fabrics were in all cases delustered, however, non-delustered fabrics can also be used.

In the case of the Amoco resin 10-5156 and the general purpose resin, the fabric had 24 warp fibers/inch×7 weft fibers/inch. The warp fibers were 1.9 mils thick and 50 mils wide and had a denier of 500±100. The weft fibers were 2.1 mils thick and 95 mils wide and had a denier of 1050.

In the case of the Amoco resin 30-605-A2, a high density polyethylene, the fabric had 10 warp fibers/inch×7 weft fibers/inch. Both the warp and weft fibers had a denier of 1000 and were 2 mils thick and 100 mils wide.

A qualitative test to determine the adhesion for all coatings to all substrates was:
1. to apply to the coated side of a fabric a pressure sensitive silver duck tape obtainable from Borden Chemical, Northfield, Ill., having dimensions 2"×8" with about a ½" unbonded end under a pressure of about 20–30 psi/linear inch in the nip between two rollers, and then
2. to remove said tape by a rapid pull.

If more than about 50% of the coating is removed then the coating is considered poor and unsatisfactory. It is readily apparent that if the coating is slick or waxy so as not to form a good bond to the pressure sensitive tape the results will vary. It is also to be expected that a particular coating will not bond with equal strength to all substrates.

In all examples disclosed, the coatings had an adhesion which was at least satisfactory.

EXAMPLE 5

The melt viscosity with Rabinowitsch correction included was determined at 190° C. in an Instron MCER rheometer for compositions A, B, and C given in TABLE 6. These compositions were formulated with the procedure disclosed in Example 1. A capillary die having an L/D of 33 was used for samples A, and B(1) and a capillary die having an L/D of 66 was used for all other samples. The observed viscosity of the above blends of polymers are shear independent (Newtonian) at shear rates below about 1 sec$^{-1}$, but shear thinning above about 1 sec$^{-1}$. Outside of the shear independent range it is necessary to define both the shear rate and the corresponding apparent viscosity. TABLE 7 lists both the apparent viscosity in centipoise and the corresponding shear rate for the compositions of TABLE 6.

From TABLE 7, it is clear that the disclosed compositions are shear thinning and that the shear independent viscosity in centipoise at low shear rates for compositions A, B(1), B(2), B(3) and C(1), C(2) and C(3) are greater than $3.8 \times 10^5$, $6.6 \times 10^5$, $1.7 \times 10^6$, $2.9 \times 10^6$, $3.5 \times 10^6$, and $6.1 \times 10^6$ centipoise, respectively.

The examples disclosed are specific illustrations of this invention, but variations on them are apparent to those skilled in the art and such variations are intended to be within the scope of this invention.

TABLE 6

| | Percent by Weight | | |
|---|---|---|---|
| Composition A | | | |
| Ethylene-Propylene Copolymer Eastman 499-P | 40% | | |
| Ethylene-Isobutylacrylate Copolymer DuPont 3647-2 | 40.8% | | |
| Fire Retardant Concentrate see TABLE 1, infra | 9.0% | | |
| Ultraviolet Light Stabilizer see TABLE 1, infra | 2.0% | | |
| Colorant see TABLE 1, infra | 8.2% | | |

| | 1 | 2 | 3 |
|---|---|---|---|
| Composition B | | | |
| Ethylene-Isobutylacrylate Copolymer DuPont 3647-2 | 33% | 24.3% | 40.5% |
| Ethylene Propylene Diene Modified Terpolymer DuPont EPDM LD-3391 | 24% | 32.4% | 8.1% |
| High Density Polyethylene Amoco 30-680-B4 HDPE | 24% | 24.3% | 32.4% |
| Fire Retardant Concentrate see TABLE 1, infra | 9.0% | 9.0% | 9.0% |
| Ultraviolet Light Stabilizer see TABLE 1, infra | 2.0% | 2.0% | 2.0% |
| Colorant | 8.0% | 8.0% | 8.0% |

| | 1 | 2 | 3 |
|---|---|---|---|
| Composition C | | | |
| Ethylene Propylene Diene Modified Terpolymer DuPont EPDM LD-3391 | 40.5% | 56.7% | 72.9% |
| High Density Polyethylene Amoco 30-680-B4 HDPE | 40.5% | 24.3% | 8.1% |
| Fire Retardant Concentrate See TABLE 1, infra | 9.0% | 9.0% | 9.0% |
| Colorant Chemtron 1784-1 | 8.0% | 8.0% | 8.0% |
| Ultraviolet Light Stabilizer see TABLE 1, infra | 2.0% | 2.0% | 2.0% |

TABLE 7

| | Shear Rate (sec$^{-1}$) | Viscosity (centipoise) |
|---|---|---|
| Composition A | $1.6 \times 10$ | $3.8 \times 10^5$ |
| | $4.0 \times 10$ | $2.5 \times 10^5$ |
| | $8.1 \times 10$ | $1.9 \times 10^5$ |
| | $1.65 \times 10^2$ | $1.4 \times 10^5$ |
| | $4.3 \times 10^2$ | $9.0 \times 10^4$ |
| | $8.8 \times 10^2$ | $6.2 \times 10^4$ |
| | $1.75 \times 10^3$ | $4.4 \times 10^4$ |
| | $4.49 \times 10^3$ | $2.5 \times 10^4$ |
| | $9.0 \times 10^3$ | $1.7 \times 10^4$ |
| | $1.8 \times 10^4$ | $1.15 \times 10^4$ |

| | 1 | | 2 | | 3 | |
|---|---|---|---|---|---|---|
| | Shear Rate (sec$^{-1}$) | Viscosity (centipoise) | Shear Rate (sec$^{-1}$) | Viscosity (centipoise) | Shear Rate (sec$^{-1}$) | Viscosity (centipoise) |
| Composition B | | | | | | |
| | $1.5 \times 10$ | $6.6 \times 10^5$ | $1.8 \times 10^0$ | $1.7 \times 10^6$ | $1.8 \times 10^0$ | $6.7 \times 10^5$ |
| | $3.8 \times 10$ | $4.7 \times 10^5$ | $4.7 \times 10^0$ | $1.3 \times 10^6$ | $4.5 \times 10^0$ | $6.0 \times 10^5$ |
| | $7.8 \times 10$ | $3.6 \times 10^5$ | $9.6 \times 10^0$ | $1.0 \times 10^6$ | $9.2 \times 10^0$ | $4.8 \times 10^5$ |
| | $1.6 \times 10^2$ | $2.7 \times 10^5$ | $2.0 \times 10^1$ | $8.0 \times 10^5$ | $1.9 \times 10^1$ | $4.1 \times 10^5$ |
| | $4.2 \times 10^2$ | $1.8 \times 10^5$ | $5.0 \times 10^1$ | $5.6 \times 10^5$ | $4.8 \times 10^1$ | $3.0 \times 10^5$ |
| | $8.6 \times 10^2$ | $1.25 \times 10^5$ | $1.0 \times 10^2$ | $4.2 \times 10^5$ | $9.7 \times 10^1$ | $2.4 \times 10^5$ |
| | $1.8 \times 10^3$ | $8.60 \times 10^4$ | $2.1 \times 10^2$ | $3.0 \times 10^5$ | $2.0 \times 10^2$ | $1.8 \times 10^5$ |
| | $4.8 \times 10^3$ | $4.6 \times 10^4$ | $5.3 \times 10^2$ | $2.0 \times 10^5$ | $5.0 \times 10^2$ | $1.3 \times 10^5$ |
| | $1.0 \times 10^4$ | $3.0 \times 10^4$ | $1.1 \times 10^3$ | $1.4 \times 10^5$ | $1.0 \times 10^3$ | $9.1 \times 10^4$ |
| | $2.0 \times 10^4$ | $1.85 \times 10^4$ | $2.2 \times 10^3$ | $9.0 \times 10^4$ | $2.1 \times 10^3$ | $6.6 \times 10^4$ |

| | 1 | | 2 | | 3 | |
|---|---|---|---|---|---|---|
| | Shear Rate (sec$^{-1}$) | Viscosity (centipoise) | Shear Rate (sec$^{-1}$) | Viscosity (centipoise) | Shear Rate (sec$^{-1}$) | Viscosity (centipoise) |
| Composition C | | | | | | |
| | $1.8 \times 10^0$ | $2.9 \times 10^6$ | $1.9 \times 10^0$ | $3.5 \times 10^6$ | $2.0 \times 10^0$ | $6.1 \times 10^6$ |
| | $4.8 \times 10^0$ | $2.3 \times 10^6$ | $5.0 \times 10^0$ | $2.4 \times 10^6$ | $5.2 \times 10^0$ | $3.7 \times 10^6$ |
| | $9.8 \times 10^0$ | $1.6 \times 10^6$ | $1.0 \times 10^1$ | $1.7 \times 10^6$ | $1.1 \times 10^1$ | $2.6 \times 10^6$ |
| | $2.0 \times 10^1$ | $1.2 \times 10^6$ | $2.1 \times 10^1$ | $1.2 \times 10^6$ | $2.2 \times 10^1$ | $1.8 \times 10^6$ |
| | $5.2 \times 10^1$ | $3.0 \times 10^5$ | $5.4 \times 10^1$ | $7.2 \times 10^5$ | $5.6 \times 10^1$ | $1.1 \times 10^6$ |
| | $1.1 \times 10^2$ | $5.7 \times 10^5$ | $1.1 \times 10^2$ | $5.1 \times 10^5$ | $1.1 \times 10^2$ | $7.7 \times 10^5$ |
| | $2.2 \times 10^2$ | $4.0 \times 10^5$ | $2.3 \times 10^2$ | $3.3 \times 10^5$ | $2.3 \times 10^2$ | $5.3 \times 10^5$ |
| | $5.6 \times 10^2$ | $2.5 \times 10^5$ | $5.7 \times 10^2$ | $2.0 \times 10^5$ | $5.8 \times 10^2$ | $3.2 \times 10^5$ |
| | $1.1 \times 10^3$ | $1.6 \times 10^5$ | $1.2 \times 10^3$ | $1.3 \times 10^5$ | $1.1 \times 10^3$ | $2.1 \times 10^5$ |
| | $2.3 \times 10^3$ | $1.0 \times 10^5$ | $2.3 \times 10^3$ | $9.1 \times 10^4$ | $2.3 \times 10^3$ | $1.3 \times 10^5$ |

The invention which is claimed is:

1. A coated article comprising a substrate selected from the group consisting of woven and nonwoven polyolefin substrates and a coating composition selected from the group consisting of:
    (1) a composition with a shear independent melt viscosity at 190° C. of above about $2.9 \times 10^6$ centipoise comprising:
        (a) about 50–90% by weight of a terpolymer containing reacted ethylene, propylene, and a diene, said terpolymer having a flow rate in the range of about 0.5–1.0 g/10 min., wherein the diene is in a low concentration up to a maximum concentration in percent by weight of about 3% and is a monomer selected from the group consisting of 1,3-butadiene, isoprene, chloroprene, cyclooctadiene-1,5, dicyclopentadiene cyclododecatriene-1,5,9, cyclododecadiene-1,7, cycloheptadiene-1,4, cyclohexadiene-1,4, norbornadiene, methylene-norbornene, methyltetrahydroindene, dimethyl-tetrahydroindene, 6-methylheptadiene-1,5, hexadiene-1,4, 6-methyl-4,7,8,9-tetrahydroindene, and ethylidene-norbornene, and wherein the reacted ethylene and propylene are in a ratio by weight of about 3:1;

(b) about 50–10% by weight of a high density polyethylene having a flow rate of about 0.2–30 g/10 min., an unannealed density in the range of about 0.956–0.965, and a weight average molecular weight in a range of about 50,000–200,000;

(c) about 0.5–5% by weight of an opacifier;

(d) about 0.5–15% by weight of a fire retardant composition comprising at least one polyhalogenated organic compound and antimony trioxide;

(e) about 0.5–3% by weight of an ultraviolet light stabilizer for polyolefins;

(2) a composition having a shear independent melt viscosity at 190° C. of above about 660,000 centipoise comprising:

(a) about 30–50% by weight of an ethylene-isobutylacrylate copolymer having a flow rate in the range of about 50–90 g/10 min., a density at 23° C. in the range of about 0.920–0.930, and comprising about 30% by weight of reacted isobutylacrylate;

(b) about 10–40% by weight of a terpolymer containing reacted ethylene, propylene, and a diene, said terpolymer having a flow rate in the range of about 0.5–1.0 g/10 min., wherein the diene is in a low concentration up to a maximum concentration in percent by weight of about 3% and is a monomer selected from the group consisting of 1,3-butadiene, isoprene, chloroprene, cyclooctadiene-1,5, dicyclopentadiene, cyclododecatriene-1,5,9, cyclododecadiene-1,7, cycloheptadiene-1,4, cyclohexadiene-1,4, norbornadiene, methylene-norbornene, methyltetrahydroindene, dimethyl-tetrahydroindene, 6-methylheptadiene-1,5, hexadiene-1,4, 6-methyl-4,7,8,9-tetrahydroindene, and ethylidene-norbornene, and wherein the reacted ethylene and propylene are in a ratio by weight of about 3:1;

(c) about 10–40% by weight of a high density polyethylene having a flow rate in the range of about 0.2–30 g/10 min., an unannealed density in the range of about 0.956–0.965, and a weight average molecular weight in a range of about 50,000–200,000;

(d) about 0.5–5% by weight of an opacifier;

(e) about 0.5–15% by weight of a fire retardant composition comprising at least one polyhalogenated organic compound and antimony trioxide;

(f) about 0.5—3% by weight of an ultraviolet light stabilizer; and (3) a composition having a shear independent melt viscosity at 190° C. of above about 380,000 centipoise comprising:

(a) about 30–75% by weight of an olefin polymer blend containing about 40–99% by weight of an ethylene-propylene block copolymer comprising at least about 80% by weight of polymerized propylene said copolymer having a flow rate of about 15–100 dg/min. and about 1–60% by weight of polyethylene having a melt index recovery of at least about 50 and a density greater than about 0.912; and (b) about 70–25% by weight of an ethylene-isobutylacrylate copolymer having a flow rate in the range of about 50–90 g/10 min., a density at 23° C. in the range of about 0.920–0.930, and comprising about 30% by weight of reacted isobutylacrylate.

2. The coated article of claim 1 wherein said coating composition is a composition with a shear independent melt viscosity at 190° C. of above about $2.9 \times 10^6$ centipoise comprising:

(a) about 50–90% by weight of a terpolymer containing reacted ethylene, propylene, and a diene, said terpolymer having a flow rate in the range of about 0.5–1.0 g/10 min., wherein the diene is in a low concentration up to a maximum concentration in percent by weight of about 3% and is a monomer selected from the group consisting of 1,3-butadiene, isoprene, chloroprene, cyclooctadiene-1,5, dicyclopentadiene, cyclododecatriene-1,5,9, cyclododecadiene-1,7, cycloheptadiene-1,4, cyclohexadiene-1,4, norbornadiene, methylene-norbornene, methyl-tetrahydroindene, dimethyltetrahydroindene, 6-methyl-heptadiene-1,5, hexadiene-1,4, 6-methyl-4,7,8,9-tetrahydroindene, and ethylidene-norbornene, and wherein the reacted ethylene and propylene are in a ratio by weight of about 3:1;

(b) about 50–10% by weight of a high density polyethylene having a flow rate of about 0.2–30 g/10 min., an unannealed density in the range of about 0.956–0.965, and a weight average molecular weight in a range of about 50,000–200,000;

(c) about 0.5–5% by weight of an opacifier;

(d) about 0.5–15% by weight of a fire retardant composition comprising at least one polyhalogenated organic compound and antimony trioxide; and (e) about 0.5–3% by weight of an ultraviolet light stabilizer for polyolefins.

3. The coated article of claim 2 wherein said polyolefin substrate is woven polypropylene.

4. The coated article of claim 2 wherein said polyolefin substrate is nonwoven polypropylene.

5. The coated article of claim 1 wherein said coating composition is a composition having a shear independent melt viscosity at 190° C. of above about 660,000 centipoise comprising:

(a) about 30–50% by weight of an ethylene-isobutylacrylate copolymer having a flow rate in the range of about 50–90 g/10 min., a density at 23° C. in the range of about 0.920–0.930, and comprising about 30% by weight of reacted isobutylacrylate;

(b) about 10–40% by weight of a terpolymer containing reacted ethylene, propylene, and a diene, said terpolymer having a flow rate in the range of about 0.5–1.0 g/10 min., wherein the diene is in a low concentration up to a maximum concentration in percent by weight of about 3% and is a monomer selected from the group consisting of 1,3-butadiene, isoprene, chloroprene, cyclooctadiene-1,5, dicyclopentadiene, cyclododecatriene-1,5,9, cyclododecadiene-1,7, cycloheptadiene-1,4, cyclohexadiene-1,4, norbornadiene, methylene-norbornene, methyl-tetrahydroindene, dimethyl-tetrahydroindene, 6-methyl-heptadiene-1,5, hexadiene-1,4, 6-methyl-4,7,8,9-tetrahydroindene, and ethylidene-norbornene, and wherein the reacted ethylene and propylene are in a ratio by weight of about 3:1;

(c) about 10–40% by weight of a high density polyethylene having a flow rate in the range of about 0.2–30 g/10 min., an unannealed density in the range of about 0.956–0.965, and a weight average molecular weight in a range of about 50,000–200,000;

(d) about 0.5–5% by weight of an opacifier;

(e) about 0.5–15% by weight of a fire retardant composition comprising at least one polyhalogenated organic compound and antimony trioxide; and (f) about 0.5–3% by weight of an ultraviolet light stabilizer.

6. The coated article of claim 5 wherein said polyolefin substrate is woven polypropylene.

7. The coated article of claim 5 wherein said polyolefin substrate is nonwoven polypropylene.

8. The coated article of claim 1 wherein said coating composition is a composition having a shear independent melt viscosity at 190° C. of above about 380,000 centipoise comprising:

(a) about 30–75% by weight of an olefin polymer blend containing about 40–99% by weight of an ethylene-propylene block copolymer comprising at least about 80% by weight of polymerized propylene said copolymer having a flow rate of about 15–100 dg/min. and about 1–60% by weight of polyethylene having a melt index recovery of at least about 50 and a density greater than about 0.912, and (b) about 70–25% by weight of an ethylene-isobutylacrylate copolymer having a flow rate in the range of about 50–90 g/10 min., a density at 23° C. in the range of about 0.920–0.930, and comprising about 30% by weight of reacted isobutylacrylate.

9. The coated article of claim 8 wherein said polyolefin substrate is woven polypropylene.

10. The coated article of claim 8 wherein said polyolefin substrate is nonwoven polypropylene.

* * * * *

UNITED STATES PATENT OFFICE
CERTIFICATE OF CORRECTION

Patent No. 4,368,233     Dated January 11, 1983

Inventor(s) Edward Barkis; Robert R. Crummer and James M. Joyner

It is certified that error appears in the above-identified patent and that said Letters Patent are hereby corrected as shown below:

Column 1, Line 43, "plyethylene" should be --polyethylene--.

Column 1, Line 55, "of 190°C" should be --at 190°C--.

Column 4, Line 8, "ybenzyl]" should be --ybenzyl)]--.

Column 9, Line 27, "1.7X10$^6$, 2.9X10$^6$," should be --1.7x10$^6$, 6.7x10$^5$, 2.9x10$^6$--.

Column 10, Line 60, "dicyclopentadiene cyclododeca-" should be dicyclopentadiene, cyclododeca--.

Signed and Sealed this

Fifth Day of July 1983

[SEAL]

Attest:

GERALD J. MOSSINGHOFF

Attesting Officer     Commissioner of Patents and Trademarks